(12) United States Patent
Koehler et al.

(10) Patent No.: US 7,600,433 B2
(45) Date of Patent: Oct. 13, 2009

(54) PRESSURE SENSOR WITH ROUGHENED AND TREATED SURFACE FOR IMPROVING ADHESIVE STRENGTH AND METHOD OF MANUFACTURING THE SENSOR

(75) Inventors: Jens Koehler, Thiendorf (DE); Lars Petersen, Dresden (DE)

(73) Assignee: Silicon Micro Sensors GmbH, Dresden (DE)

( * ) Notice: Subject to any disclaimer, the term of this patent is extended or adjusted under 35 U.S.C. 154(b) by 0 days.

(21) Appl. No.: 12/032,767

(22) Filed: Feb. 18, 2008

(65) Prior Publication Data

US 2008/0202250 A1   Aug. 28, 2008

(30) Foreign Application Priority Data

Feb. 23, 2007   (DE) ....................... 10 2007 009 372

(51) Int. Cl.
  *G01L 7/00* (2006.01)
(52) U.S. Cl. ............................. 73/756; 73/753; 73/754
(58) Field of Classification Search ............ 73/700–756
  See application file for complete search history.

(56) References Cited

U.S. PATENT DOCUMENTS

| | | | |
|---|---|---|---|
| 4,276,533 A * | 6/1981 | Tominaga et al. | ............... 338/4 |
| 5,186,055 A * | 2/1993 | Kovacich et al. | ............... 73/727 |
| 6,578,426 B2 * | 6/2003 | Imai et al. | ..................... 73/720 |
| 6,584,851 B2 * | 7/2003 | Yamagishi et al. | ............ 73/715 |
| 7,047,815 B2 * | 5/2006 | Sashinami et al. | ............ 73/718 |
| 7,143,651 B2 * | 12/2006 | Sasaki et al. | .................. 73/721 |
| 7,246,526 B2 * | 7/2007 | Won et al. | ..................... 73/754 |
| 7,363,819 B2 * | 4/2008 | Mast et al. | ..................... 73/754 |
| 7,370,536 B2 * | 5/2008 | Ueyanagi et al. | ............. 73/754 |
| 7,448,276 B2 * | 11/2008 | Crockett et al. | ............... 73/718 |

\* cited by examiner

*Primary Examiner*—Lisa M Caputo
*Assistant Examiner*—Jermaine Jenkins
(74) *Attorney, Agent, or Firm*—Heslin Rothenberg Farley & Mesiti P.C.

(57) ABSTRACT

A pressure sensor comprises a housing, a housing socket and a pressure port which projects into the housing and which is made of a lead free material. The pressure sensor exhibits a pressure sensing element, which is adhesively cemented on the pressure port, so that a passage, located in the pressure port, is sealed on one side. In one region, the pressure port exhibits a surface roughness and is provided with an adhesion promoting coat. In this region, the pressure sensing element is connected by adhesive cement to the pressure port.

17 Claims, 1 Drawing Sheet

Figure 1:
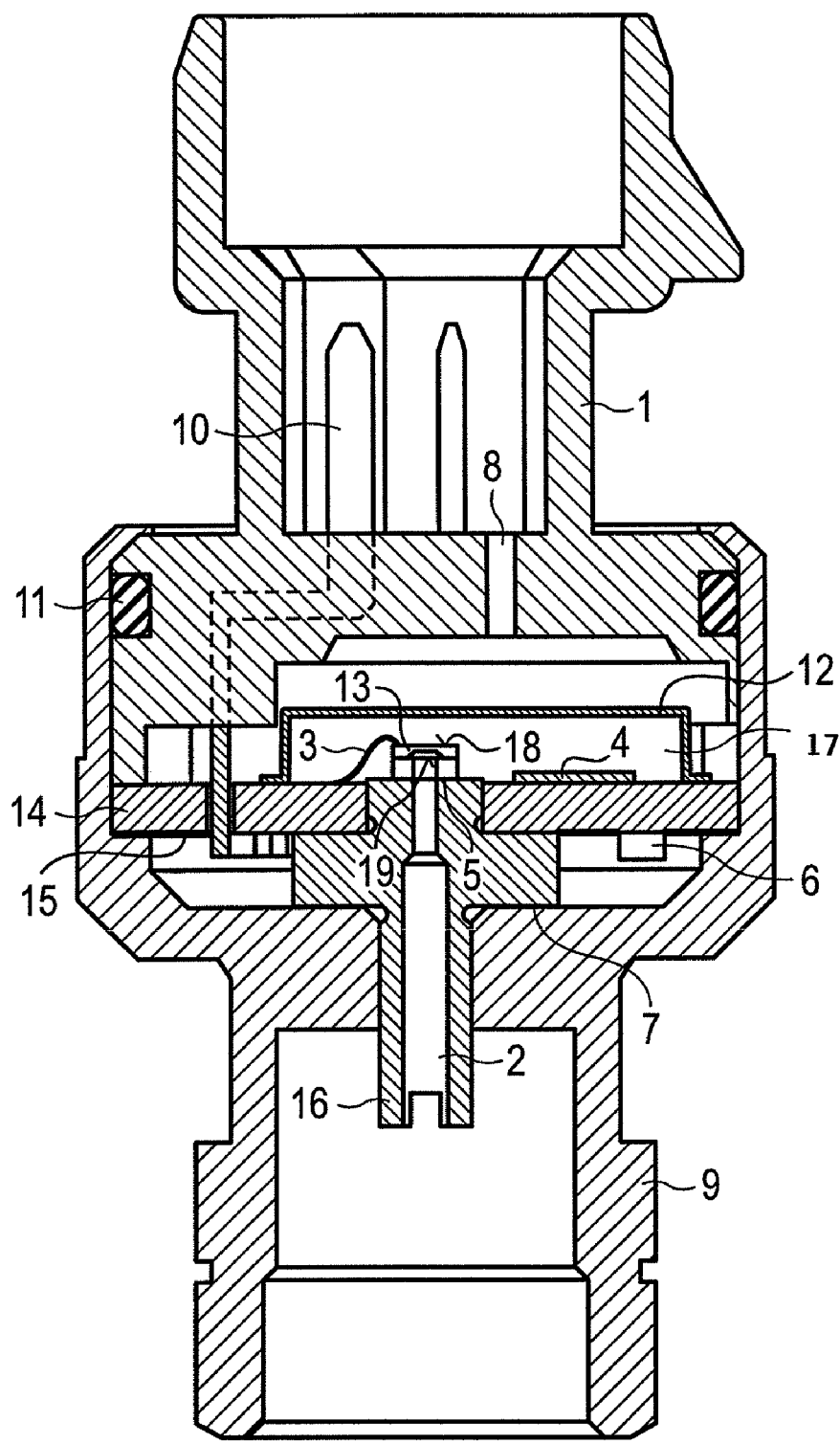

PRESSURE SENSOR WITH ROUGHENED AND TREATED SURFACE FOR IMPROVING ADHESIVE STRENGTH AND METHOD OF MANUFACTURING THE SENSOR

CROSS REFERENCE TO RELATED APPLICATIONS

This application claims priority of German application No. 10 2007 009 372.3 filed on Feb. 23, 2007 the entire disclosure of these applications being hereby incorporated herein by reference.

BACKGROUND ART

Provided is a pressure sensor, comprising a housing with a pressure port, which projects into the housing, and which is fitted with a micromechanical pressure sensing element, which is arranged in the housing. The pressure sensing element is connected to the pressure port in such a manner that it seals a passage of the pressure port, by way of which a pressure acts directly on the pressure sensing element. In addition, a method for manufacturing such a pressure sensor is provided.

Such pressure sensors are used for monitoring the pressure of the pressure fluctuations in various fields of applications exhibiting widely varying pressure ranges. For example, in control units for piston motors or in piston compressors the requirements with respect to pressure stability, temperature range and service life are very stringent. In particular, under very high and to some extent vigorous pressure fluctuations and maximum pressures, which may occur, the reliability of the pressure-loaded connections, which are often designed as a cemented joint, must be guaranteed under all operating conditions.

A typical design of a pressure sensor is described, for example, in the DE 102 60 105 A1. However, in this case the description does not refer to a surrounding housing. A pressure sensing element is mounted with its diaphragm over the passage of a pressure port through intercalation of a glass base, so that a pressure, which is applied in the passage of the pressure port and that is to be measured, acts on the diaphragm. Measurement resistors are arranged on the opposite side of the diaphragm (this side is often called, as also below, the front side of the pressure sensing element). These measurement resistors determine by means of their resistance variation the applied pressure or a pressure fluctuation. The variation in resistance results, as well-known, from a deflection of the diaphragm from its quiescent position as a consequence of a change in the applied pressure and the associated tensile load or pressure load on the diaphragm. When pressure is applied, the connection of the pressure sensing element on the pressure port and optionally also the connections between two others of the components—pressure sensing element, base, pressure port, and housing—are under high tension. This leads, especially at high pressure and long term usage of the pressure sensor, to reliability problems. A comparable pressure sensor is also described in the U.S. Pat. No. 7,024,937.

These problems increase with the statutory requirement stipulating the use of lead free materials, since it is possible only with difficulty to produce in terms of pressure and temperature a reliable cemented joint between the lead free components of a pressure sensor, as described, for example, in the EP 1 785 710 A2, or to produce reliable cemented joints, which are made of other materials that are capable of withstanding higher chemical and mechanical stresses, over the entire area of application.

Therefore, the object of the invention is to provide a pressure sensor that satisfies the requirements of reliability even at high pressures and pressure differentials while simultaneously using lead free materials.

BRIEF SUMMARY OF INVENTION

In the case of the described pressure sensor it is possible to use for both the pressure port and at least those parts of the housing, which are pressure loaded, such materials, which are lead free and simultaneously withstand the high mechanical and also chemical stresses that can be generated by the applied liquid or gaseous medium, such as polluted air, oil or refrigerants. With the use of these materials, the pressure loaded connections of the individual components of the pressure sensor, in particular the connection between the pressure sensing element and the pressure port, can be produced by means of a cemented joint. In this case the cemented joint permanently withstands pressure loads of 40 bar operating pressure and higher. Furthermore, owing to the improved adhesive properties the described cemented joints have proven to be stable over a wide temperature range and also at high cyclic temperature stresses. Hence, operating temperatures in a range of −40° C. to 135° C. and storage temperatures of up to 150° C. are possible without causing damage to the cemented joints.

In order to produce the necessary adhesive strength of the adhesive surfaces with the adhesive material, at least those regions of the surface of the pressure port, with which a pressure loaded cemented joint is to be produced, exhibit special surface properties. These regions relate, first of all, to the cemented joint between the pressure port and the pressure sensing element, on which the applied pressure to be measured acts directly. Insofar as the pressure sensing element is adhesively cemented to the pressure port with intercalation of additional components, it also concerns the cemented joint between the pressure port and this complementary component. Such components may be, for example, a glass or silicon base, which is connected to the backside of the pressure sensing element. These components are inserted in order to carry out, inter alia, a decoupling between the diaphragm of the pressure sensing element and the port. Insofar as the thermal expansion coefficient of the base is adapted approximately to the pressure sensing element, the influence of the thermal expansion behavior of the pressure port decreases as compared to that of the pressure sensing element.

In addition, the connection between the pressure port and the housing is often under tensile force or shear force due to the influence of the pressure. Thus, in one embodiment of the pressure sensor, this connection also exhibits the characteristic properties of the surface that are comparable to those properties of the pressure port. Such a connection between the pressure port and the housing avoids the use of special sealing elements, such as sealing rings, which may prove to be a problem with respect to the thermal and chemical load.

The surface regions under discussion exhibit, according to the invention, a defined roughness and are covered with an adhesion promoting coat, where an adhesion promoting coat is characterized in that it conform to and, thus, maps in a barely changed manner the surface structure.

The necessary roughness is produced with the well-known blasting process by using different blasting material and by setting the exposure time. With both parameters diffuse surface structures are to be produced that may differ with respect to both their structures and their roughness parameters. Diffuse roughness is defined here as a surface profile without regularly recurring structures, such as those that can be found after machining operations, embossing of a texture or the like. The properties of the surface structures can be adapted to a wide variety of mechanical and chemical loads by means of the process or the process parameters. In addition to the roughness of the surface, a compression of the upper-most layers of the material to be treated can be achieved by means of the blasting process as a function of the process itself and its parameters as well as the blasting material. This effect, too, has a significant influence on the adhesive strength of the cemented joint and is supposed to be adapted through optimization to the respective requirements by means of the said possible variations.

The surface characteristics with respect to roughness and surface compression are to be optimized, inter alia, for the respective application as a function of the adhesive that is used and the possible dimensions and structure of the respective adhesive area. The blasting process itself depends in turn on the material of the pressure port to be blasted. For example, in the case of thermally stressable materials, like metals, the compressed air blasts, otherwise blasting with a blasting medium, dispersed in a liquid, are used. Owing to this optimization of the roughness parameters, during the treatment of a plurality of surfaces on a component these surfaces may also exhibit diverging characteristics.

The adhesive bonding coat can be produced by means of a suitable method, depending on the material of the component to be provided with the adhesion promoting coat. In addition to the structure of the surface to be bonded, the molecular forces between the adhesive and the surface as well as the bonding and energetic conditions, which are reflected, inter alia, in the wetting power of the surface, have an influence on the adherence of the adhesive on the surface to be bonded. Since in particular an energetic evaluation of a surface with respect to its adhering power is possible only with extreme difficulty, the adhesion promoting coat is usually produced by means of an optimization process.

The optimization process is based, inter alia, on the material of the surface to be cemented, the adhesive and the thermal, chemical and mechanical loads on the cemented joint. Depending on the material, there are a variety of different methods for producing an adhesion promoting coat. In the case of metal surfaces, passivation layers are suitable. In this case the conforming passivation layer can be produced by means of the various parameters of the passivation method, such as the residence time of the component in the passivation bath. In this case the term—conformity of a layer—describes a homogeneous layer thickness, independent of the horizontal, vertical or angular orientation, and independent of the structure of the coated surface section. Furthermore, in the case of metals and similarly plastic materials, plasma treatments are suitable for changing the bonding properties of a surface layer of the material in such a manner that the adhesion may be enhanced. In fact, the adhesive bonding coat is necessary only in the region to be bonded, but can also be produced just as well on the entire surface of the component.

The adhesion promoting coat may exhibit diverging properties at different surface sections of a component. A uniform adhesion promoting coat on the entire pressure port is possible as an alternative and is to be produced more cost effectively. Insofar as the adhesion promoting coat is formed, according to one embodiment, by means of a passivation layer, a total passivation of the pressure port may take place, for example, in the event that said pressure port is used in an aggressive environment, so that the adhesion promoting coat serves in those regions that are not covered with adhesive as the corrosion protection, in particular, against the applied medium. It is possible to produce the adhesion promoting coat section by section or in a different way section by section by means, for example, of a suitable masking process.

Owing to the improved adhesive strength of the surfaces to be connected, a cemented joint, which is produced with a surface that is structured and treated in such a manner, is in a position to absorb the stress that is induced by varying thermal expansion properties. Since the cemented joint is improved by the surface structure of the pressure port and the adhesion promoting coat, it is also possible to use, as a function of the thermal stress load to be expected, a type of adhesive that is adapted to this load and not exclusively to the materials to be connected, because the described surface properties of the surfaces to be adhesively bonded to each other enable the use of well-known adhesive materials, which have also been used in the past for lead containing materials. Hence, their properties and application have been tried and tested.

BRIEF DESCRIPTION OF THE DRAWING FIGURES.

The inventive pressure sensor shall be explained in detail below with reference to a few embodiments. The related FIGURE is a schematic rendering of a vertical view of a pressure sensor.

DETAILED DESCRIPTION

The pressure sensor comprises a housing 9 and a housing socket 1, both of which are connected in a sealing and detachable manner. In the illustrated embodiment, the housing 9 encloses the housing socket 1 section by section in a positive locking manner. The tightness of the connection with respect to dust and moisture is produced by means of a sealing ring 11, which envelops the housing socket 1 and is applied to the housing 9. The housing 9 and the housing socket 1 envelop a cavity 17, into which a pressure port 16 projects. Both the pressure port 16 and the housing 9 and the housing socket 1 are made of a lead free material. The housing socket 1, which is not exposed to the pressure medium, is made of a plastic material; and the two former components are made of a lead free aluminum alloy. As an alternative, other materials can also be used in this case—for example, brass, plastic or stainless steel—which exhibit a mechanical and chemical stability in many applications. Both components may also be made of diverging materials.

The pressure port 16 exhibits a passage 2, which empties into the cavity 17 and is sealed with a pressure sensing element 13 in said cavity. The pressure sensing element 13 is a micromechanical component and semiconductor based. In the present embodiment said pressure sensing element is a piezo-resistive silicon pressure sensing element 13, which exhibits a glass base on its backside. The glass base also has a passage, which empties into a diaphragm of the pressure sensing element 13. The pressure sensing element 13 is mounted on the pressure port 16 in such a manner with the intercalation of the glass base that the passage of the glass base corresponds with the passage 2 of the pressure port 16. Thus, a medium, applied in the pressure port 16, acts on the backside 19 of the pressure sensing element 13. As an alternative, the pressure sensor can also be produced with another, suitable pressure sensing element 13; or it can be mounted directly on the pressure port 16 without a glass base or mounted on the pressure port with another base.

The pressure sensing element 13 is mounted on the pressure port 16 by means of a cemented joint. The region of the pressure port 16, in which the cemented joint with the pressure sensing element 13 is produced, shall be referred to below as the first region 5. In a second embodiment of the pressure sensor, the pressure port 16 is connected to the housing 9 by means of another cemented joint in a second region 7. As an alternative, this joint can also be produced with other means, for example, by means of suitable holding elements.

In order to produce a secure and lasting cemented joint, one region or both regions 5, 7 of the pressure port 16 is/are provided with a surface roughness. In one embodiment of the pressure sensor the surface roughness is produced by means of a pressure blasting process, in which spherical blasting material—for example, beads made of glass, ceramic or the like—are used. The surface, which is treated in this manner, exhibits a crater-shaped or diffuse roughness in the respective regions. This roughness does not include peaks, but rather only rounded off edges and peaks. Defined roughness properties can be adjusted by defined bead sizes, which may also differ in the blasting material. Such a structure shows surprisingly, in connection with the additional measures, described below, very good results in stress tests.

Furthermore, the said region(s) 5, 7 is/are coated with a passivation layer, which simultaneously serves as the corrosion protection for the pressure port 16 and the housing 9. In one embodiment of the invention, the passivation layer does not comprise any chromium (VI) containing components owing to the use of chromium (VI)-free or chromium (III) containing bath material for producing the passivation layer. Therefore, the requirements, according to which no chromium (VI) containing compounds shall be used, are met especially in the electrical and automotive industry.

A passivation layer having the aforementioned properties is achieved by means of optimized process parameters, such as the bath residence time, bath concentration, bath temperature or the pH value. The optimization may take place on the materials, which are to be connected, and the load applications and the alternating loads, which are to be expected. In connection with the surface roughness, the passivation layer guarantees a reliable cemented joint between the pressure port 16 and the pressure sensing element 13 as well as between the pressure port 16 and the housing 9, said cemented joint being suitable at the said high pressures and temperatures for continuous loads, such as those in the automotive field.

Even if the designs with respect to the surface structure and the adhesion promoting coat were applied only to the regions included in the cemented joint, it is, of course, possible to treat all of the components in such a manner for the purpose of effecting the production processes, because neither the surface structure nor the adhesion promoting coat has an influence on the function of the pressure sensor. Insofar as the seals, where the surface roughness could have an effect, are to be produced, these seals are realized either by the cemented joint itself—for example, between the pressure port 16 and the housing 9—or are to be achieved by means of suitable sealing materials or by smoothing the surface section by section with the requisite pressure tightness or by means of a combination of both.

Owing to the targeted improvement of the adhesion properties of the roughened regions 5, 7 of the pressure port 16 that are provided with an adhesion promoting coat, another embodiment of the pressure sensor provides that with suitable housing material that section of the housing 9 that serves the cemented joint may be surface modified, as described above.

Thus, both surfaces, which are to be connected together by the adhesive, are instrumental in improving the connection. The above described conditions apply to the properties and the production of the modification of the housing surface, so that reference is made to this description. Insofar as the material of the housing 9 deviates from the material of the pressure port 16, the properties of the respective surface regions and the respective necessary processes may also deviate from each other.

Moreover, the pressure sensor, depicted in the FIGURE, exhibits a circuit carrier 14, which is also cemented on the pressure port 16. The circuit carrier 14 is configured on the pressure port 16 in such a manner that a reliable electrical connection can be produced between the measurement resistors (not illustrated) of the pressure sensing element 13 and the circuit elements of the circuit carrier 14 by means of flexible connectors 3. In order to condition the signals, which are sampled at the measurement resistors, one embodiment of the pressure sensor provides that the circuit carrier 14 exhibits on its side facing the pressure sensing element 13 suitable integrated circuits (ICs) 4. The mounting of the circuit carrier 14 on the pressure port 16 positions it in a defined position to the pressure sensing element 13, thus removing the mechanical stress from the flexible electrical connection between the two. In alternative embodiments, the circuit carrier 14 may also be mounted on the housing 9 or on the housing socket 1, insofar as thermal or pressure induced relative movements between the circuit carrier 14 and the pressure sensing element 13 can be compensated by the electrical connection.

On the side facing away from the pressure sensing element 13, the circuit carrier 14 may exhibit SMD components, which implement additional functions of the pressure sensor. For example, they may be used to measure the temperature in the cavity 17 of the pressure sensor in order to assess and compensate the temperature effects on the measurement electronics.

In another embodiment, the pressure sensing element 13 and at least parts of the circuit carrier 14, on which the ICs 4 are mounted, including the flexible electrical connectors 3 between the two, are covered by a capper 12. This capper 12 may be mounted in a sealing manner on the circuit carrier 14 or, as an alternative, on the pressure port 16, so that a defined reference pressure, surrounding the pressure sensing element 13, can be produced in the capper. However, said capper may also be used merely as a mechanical protection for the pressure sensing element 13 and optionally the ICs 4, so that in this case a simple fastening of the capper 12 relative to the components suffices. As an alternative, the capper 12 may also be mounted pressure tight and may exhibit pressure compensating orifices, so that a reference pressure or the ambient pressure can be produced by choice in the capper 12. With such a modification or with such a comparable modification, the pressure sensor can be used as both a differential pressure sensor and as a relative pressure sensor as well as an absolute pressure sensor. The ambient pressure acts on the front side 18 of the pressure sensing element 13 by way of an orifice 8 in the housing socket 1 and an open pressure compensating orifice (not illustrated) in the capper 12, so that a relative pressure between the pressure, applied in the pressure port 16, and the ambient pressure can be measured. Similarly a defined pressure can be applied in the orifices in the housing socket 1 and the capper, so that the differential pressure can be measured. If, in contrast, a reference pressure or vacuum is set in the interior of the pressure sensor by means of the pressure tight capper 12, the absolute pressure can be measured.

In order to protect against ambient conditions, the pressure sensing element 13 may be covered alone or in connection with an IC 4 by means of a protective layer. This measure is possible as a supplement or alternative to the arrangement of a capper 12.

In one embodiment of the pressure sensor the housing socket 1, which covers the pressure sensing element 13 and the circuit carrier as well as, if desired, the capper 12, is made of a plastic material and is fitted with exterior, injected molded contacts 10 for the electrical connection of the electronic components in the interior of the pressure sensor.

The invention claimed is:

1. Pressure sensor, comprising a housing, a housing socket, a pressure port which projects into the housing and is made of a lead free material, and a pressure sensing element adhesively cemented on the pressure port, so that a passage located in the pressure port is sealed on one side, wherein a first region of a surface of the pressure port is roughened and is provided with a conforming adhesion promotion coat to improve adhesive strength, and in said region, the pressure sensing element is connected to the pressure port by adhesive cementing.

2. Pressure sensor, as claimed in claim 1, wherein the first region of the pressure port is roughened in such a manner that a surface profile exhibits rounded off edges and rounded off peaks.

3. Pressure sensor, as claimed in claim 1, wherein the pressure sensing element is provided with a glass or silicon backside, which is connected by the adhesive cementing to the pressure port.

4. Pressure sensor, as claimed in claim 1, wherein, in an additional region the pressure port is connected by adhesive cementing to the housing; and the additional region exhibits a diffuse surface roughness and includes an adhesion promotion coat.

5. Pressure sensor, as claimed in claim 1, wherein the housing comprises a lead free aluminum alloy, brass, plastic material or stainless steel.

6. Pressure sensor, as claimed in claim 5, wherein, in a region of cemented joint with the pressure port, a surface of the housing is roughened and provided with an adhesion promotion coat.

7. Pressure sensor, as claimed in claim 1, wherein the adhesion promotion coat comprises a passivation layer.

8. Pressure sensor, as claimed in claims 7, wherein the passivation layer does not include any chromium (VI) containing components.

9. Pressure sensor, as claimed in claim 1, wherein the housing is coated with a passivation layer.

10. Method for manufacturing a pressure sensor, comprising a housing; a housing socket connected to the housing; a pressure port projecting into the housing; and a pressure sensing element, which is connected to the pressure port and which seals a passage located in the pressure port, on one side, comprising the following process steps:

providing a pressure port made of a lead free material, producing a diffuse roughness of a surface of the pressure port a blasting process in a first region, which surrounds the passage and on which subsequently is mounted the pressure sensing element, producing a conforming adhesion promoting coat on the surface of the pressure port, which covers at least the first region, and cementing the pressure sensing element on the first region of the pressure port with adhesive.

11. Method, as claimed in claim 10, wherein in an addition region, a diffuse surface roughness is produced on the pressure port by a blasting process; and an adhesion promotion coat, which covers this additional region is provided; and, in this additional region, the pressure port is connected by adhesive cementing to the housing.

12. Method, as claimed in claim 10, wherein spherical blasting material is used for the blasting process.

13. Method, as claimed in claim 10, wherein the pressure sensing element is provided with a glass or silicon backside; and a connection between the glass or silicon backside and the pressure port is accomplished by adhesive cementing.

14. Method, as claimed in claim 10, wherein a housing made of a lead free aluminum alloy, brass, plastic material or stainless steel is used.

15. Method, as claimed in claim 10, wherein the adhesion promotion coat is produced by passivating the surface.

16. Method, as claimed in claim 15, wherein the adhesion promotion coat comprises a passivation layer made of a chromium (VI)-free material.

17. Method, as claimed in claim 10, wherein a passivation layer is produced on a surface of the housing.

* * * * *